Dec. 26, 1939.  G. A. GRACEY  2,184,798
DEVICE FOR DEFLECTING AIR STREAMS
Filed June 23, 1938
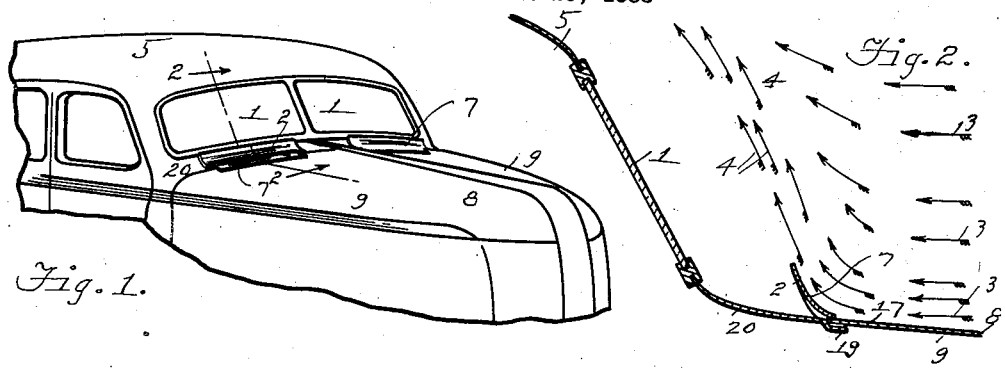
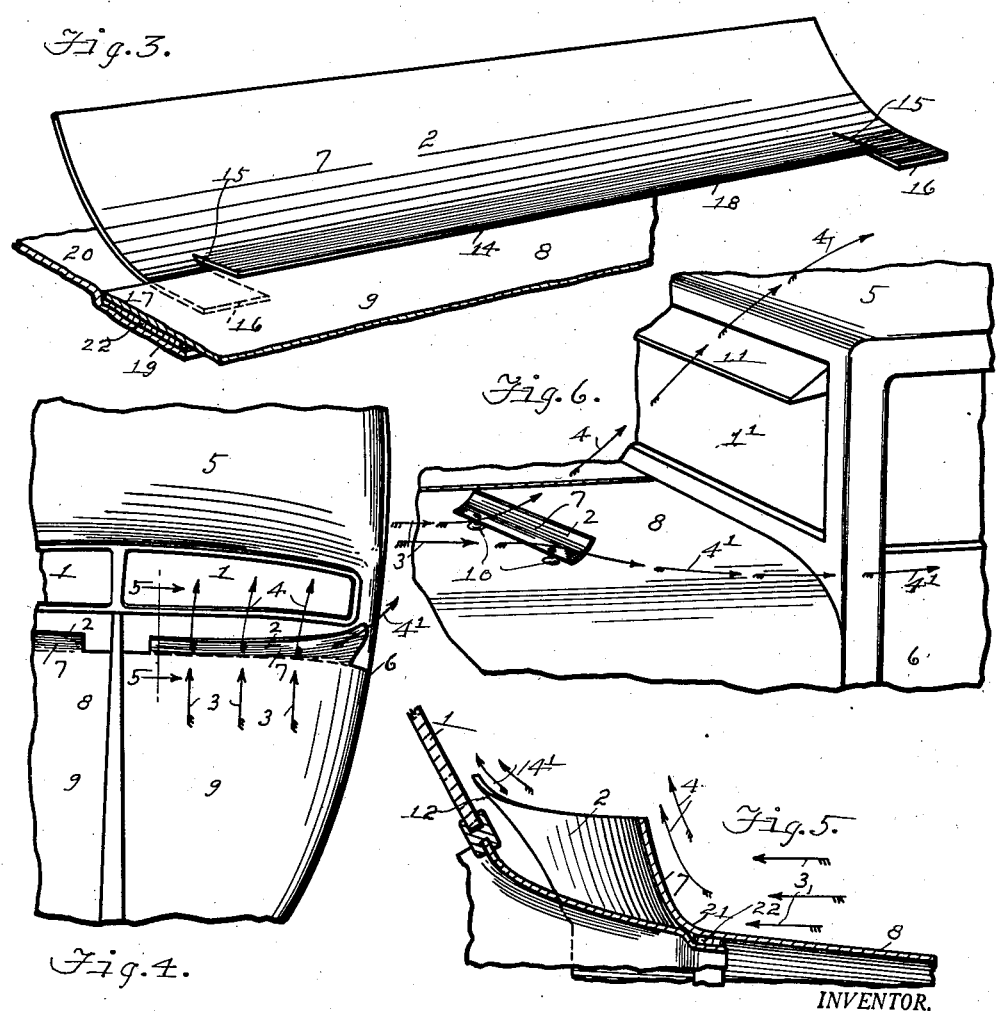
INVENTOR.
Glen A. Gracey
BY
Rice and Rice
ATTORNEYS.
Witness:
John S. Braddock Patented Dec. 26, 1939

2,184,798

UNITED STATES PATENT OFFICE 2,184,798

DEVICE FOR DEFLECTING AIR STREAMS

Glen A. Gracey, Grand Rapids, Mich.

Application June 23, 1938, Serial No. 215,354

4 Claims. (Cl. 296—91)

The present invention relates to devices for deflecting air streams striking moving vehicles, particularly devices for deflecting from the windshields of automobiles and the like the air streams caused by the wind or the forward movement of the automobile and for the especial purpose of preventing the lodgment of insects or other objects as dust, dirt or the like on the windshields or for removing the same therefrom.

This and any other and more specific objects hereinafter appearing are attained by, and the invention finds preferable embodiment in, the illustrative device particularly described in the body of this specification and illustrated by the accompanying drawing, in which—

Figure 1 is a view in perspective of a portion of an automobile and a pair of air stream-deflecting devices applied thereto;

Figure 2 is a vertical longitudinal sectional view thereof taken on line 2—2 of Figure 1;

Figure 3 is a view in perspective of one of said devices and portions of the automobile, illustrating the manner in which this device is removably applied to the auomobile;

Figure 4 is a top plan view of the forward portion of an automobile and a pair of air streamdeflecting devices, illustrating a modified construction thereof in which these devices are formed as integral parts of the automobile, i. e. the hood thereof;

Figure 5 is a vertical longitudinal sectional view of the same taken on line 5—5 of Figure 4;

Figure 6 is a view in perspective of the forward portion of an automobile of another type and an air stream-deflecting device thereon, illustrating a modified construction thereof wherein the device is removably held in desired position by vacuum cups.

Insects and other objects as dust, dirt or the like, borne by air streams caused by the wind or by the traveling movement of an automobile, are frequently lodged on the wind-shield thereof, soiling the same and interfering with visibility therethrough. It is the object of this invention to provide simple and economically-manufactured means for obviating this condition by preventing the lodgment of such objects on the windshield, or by removing the same therefrom.

To effect this object, I provide a device for deflecting the air stream from the windshield, so that insects or other objects, borne by the stream will not reach the windshield to find lodgment thereon, or so that any such objects lodges or resting on the windshield will be swept away therefrom by the force of the stream thus deflected.

The device is desirably made of thin sheet metal, as "stainless steel" or the like, and is carried by the automobile forwardly of its windshield 1 and at such distance therefrom and such angle relatively thereto as will deflect the air stream to the best advantage for accomplishing the desired result.

The device, as illustrated by the drawing, has an air stream-deflecting main portion 2 and a portion or means whereby the device may be mounted on, applied to or connected with, the automobile. Said main portion 2 is inclined from the direction, indicated by arrows 3, in which the air stream strikes it so as to deflect the stream into the direction, indicated by arrows 4, 4$^1$ in these views, in which the stream does not strike the windshield at all, or strikes it at such an angle or without sufficient force or sufficient volume to carry thereto and lodge thereon any objects borne by the stream.

Thus the air stream-deflecting main portion 2 is inclined upwardly-rearwardly so as to deflect the air stream over the top 5 of the automobile as indicated in the views, and/or laterally-rearwardly as seen in Figures 4, 5 and 6 so as to deflect the stream along the automobile's side 6. The forward-upper side 7 of this portion (on which side the air stream strikes) is desirably concavely curved in transverse cross-sectional planes as shown, so that a somewhat rotating or swirling movement is imparted by such curved shape to the objects borne by the stream thus tending to prevent such objects as may reach the windshield from adhering thereto or finding lodgment thereon.

A pair of these devices are desirably carried by the automobile especially shown in Figure 1, the top of whose hood 8 has a pair of outwardly-downwardly inclined side portions 9; and the devices may be positioned on the hood at desired distances from the windshield and at desired horizontal angles as best seen in Figure 6, for deflecting the air stream laterally over the side of the vehicle as indicated by the arrows 4$^1$ in that view; and the device may be removably held in adjusted position by suitable means as the vacuum cups indicated at 10. The type of automobile shown in Figure 6 has a vertical windshield 1$^1$ with a visor 11 instead of the rearwardly-upwardly inclined windshield 1 shown in the other views, so that devices which thus deflect the air stream horizontally-laterally are particularly well adaptable to automobiles of the type shown in Figure 6. This portion 2 of the device may desirably flare at one end as shown at 12 in Figure 5.

The portion of the device whereby it is mounted on or connected with the automobile may take various forms for different purposes. As shown in Figures 1, 2 and 3, which illustrate its simplest form, the device has a forwardly extending portion 14 split at 15 to provide clips 16 whereby this form of the device may be readily applied by inserting the rear edge portion 17 of the automobile's hood between the body 18 of said portion 14 and the clips so that in the closed position of the hood the device is held between the hood and the front edge portion 19 of the automobile's cowl 20. It will be seen that this form of the device may be readily positioned in desired horizontal angles by merely inserting the hood farther into one split 15 than into the other.

In the form of the device shown in Figures 4 and 5 its mounting portion merges at 21 with the top of the hood. A strip 22 of felt or the like is shown covering the forward edge portion of the cowl as in usual automobile construction.

These devices, whose air stream-deflecting portions 2 extend inclinedly as shown, serve the additional purpose of balancing the vehicle against "air sway" in its traveling movement.

The invention being intended to be pointed out in the claims, is not to be limited to or by details of construction of any particular embodiment thereof illustrated by the drawing or hereinbefore shown or described.

I claim:

1. A device of the class described for deflecting air streams from and preventing lodgment of insects, dust and the like on the windshields of automobiles and the like which have a cowl and a hood movable to open position and to closed position wherein its rear edge portion overlies the forward edge portion of the cowl, said device comprising a shield inclined from the direction of the air stream for deflecting the same therefrom and a forwardly extending base having a vertical slit therethrough extending from its front edge and a pair of vertically spaced portions on the opposite sides of the slit adapted to receive and hold between them the rear edge portion of the hood, the hood being adapted to hold the base portion of the device on the forward edge portion of the cowl in the hood's closed position.

2. A device of the class described for deflecting air streams from and preventing lodgment of insects, dust and the like on the windshields of automobiles and the like which have a cowl and a hood movable to open position and to closed position wherein its rear edge portion overlies the forward edge portion of the cowl, said device comprising a shield inclined from the direction of the air stream for deflecting the same therefrom and a forwardly extending base having laterally spaced vertical slits therethrough extending from its front edge and a pair of vertically spaced portions on the opposite sides of each slit adapted to receive and hold between each pair the rear edge portion of the hood, the hood being adapted to hold the base portion of the device on the forward edge portion of the cowl in the hood's closed position.

3. A device of the class described for deflecting air streams from and preventing lodgment of insects, dust and the like on the windshields of automobiles and the like which have a cowl and a hood movable to open position and to closed position wherein its rear edge portion overlies the forward edge portion of the cowl, said device comprising a shield inclined from the direction of the air stream for deflecting the same therefrom and a forwardly extending base having a vertical slit therethrough extending from its front edge and a pair of vertically spaced portions on the opposite sides of the slit adapted to receive and hold between them the rear edge portion of the hood, the hood being adapted to hold the base portion of the device on the forward edge portion of the cowl in the hood's closed position, the shield having a hard and smooth front surface for preventing lodgment of insects, dust and the like thereon.

4. A device of the class described for deflecting air streams from and preventing lodgment of insects, dust and the like on the windshields of automobiles and the like which have a cowl and a hood movable to open position and to closed position wherein its rear edge portion overlies the forward edge portion of the cowl, said device comprising a shield inclined from the direction of the air stream for deflecting the same therefrom and a forwardly extending base having laterally spaced vertical slits therethrough extending from its front edge and a pair of vertically spaced portions on the opposite sides of each slit adapted to receive and hold between each pair the rear edge portion of the hood, the hood being adapted to hold the base portion of the device on the forward edge portion of the cowl in the hood's closed position, the shield having a hard and smooth front surface for preventing lodgment of insects, dust and the like thereon.

GLEN A. GRACEY.